Jan. 19, 1937.   H. Z. BISHOP   2,068,050
ANTISKID TIRE
Filed July 6, 1935
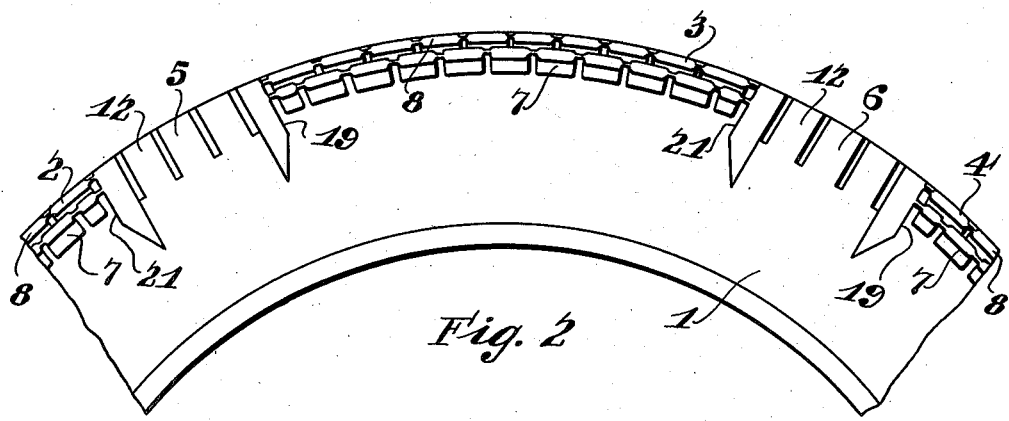
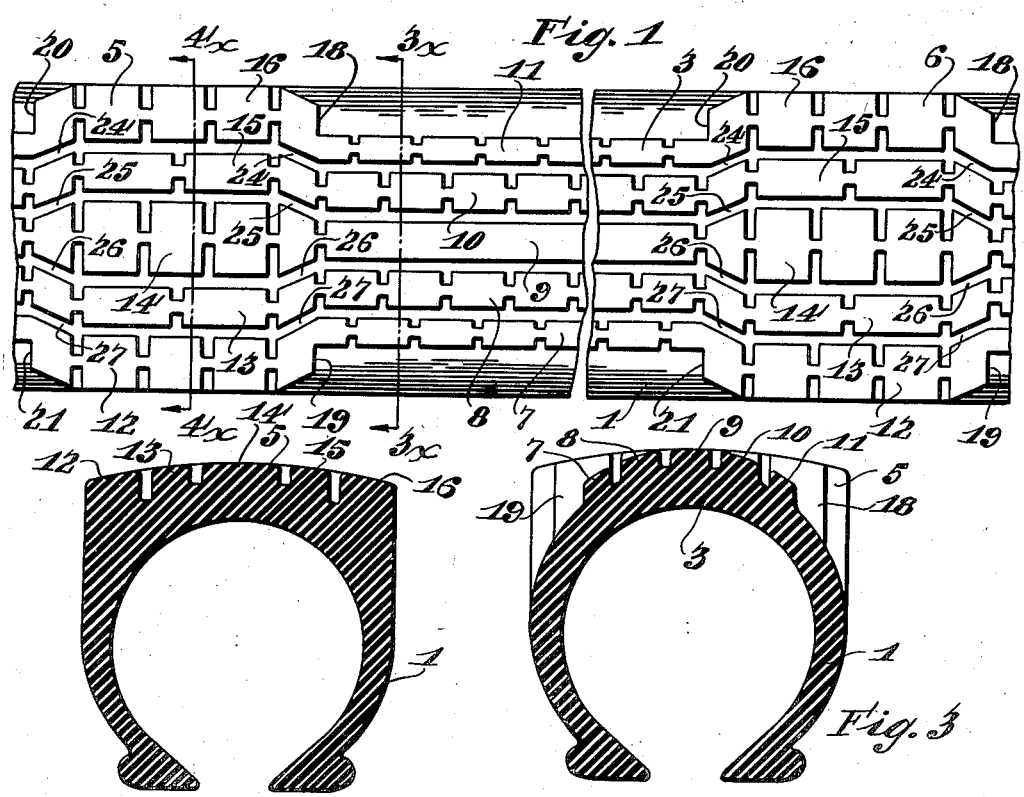
INVENTOR
Harry Z. Bishop
BY
Frank Keifer
ATTORNEY Patented Jan. 19, 1937

2,068,050

UNITED STATES PATENT OFFICE 2,068,050

ANTISKID TIRE

Harry Z. Bishop, Lyons, N. Y.

Application July 6, 1935, Serial No. 30,099

7 Claims. (Cl. 152—14)

The object of this invention is to provide an antiskid tire in which the tread of the tire is molded of different patterns and different widths in short lengths, these lengths being alternated with each other.

Another object of the invention is to mold the tread of the tire with a pattern of standard width in short lengths, alternated with patterns of much greater width also in short lengths, the lengths being alternated with each other, and the whole tread being made integral of rubber.

These and other objects of the invention will be illustrated in the drawing, described in the specification and pointed out in the claims at the end thereof.

In the drawing:

Figure 1 is a plan view of the tread of the tire.

Figure 2 is a side elevation of the tire, showing the tread.

Figure 3 is a section on the line $3x$—$3x$ of Figure 1.

Figure 4 is a section on the line $4x$—$4x$ of Figure 1.

In the drawing like reference numerals indicate like parts.

In the drawing reference numeral 1 indicates the body of an automobile tire made in the usual way. The tread of this tire, as shown at 2, 3 and 4, is finished with any of the ordinary standard patterns or with the special pattern such as is shown in Figure 1. These patterns are in short sections and are of standard width. Alternating with these sections are the sections 5 and 6, which are wider than the standard or intermediate sections of the tread. The width of the standard section of the tread is shown in section in Figure 3, and the width of the wide section of the tread is shown in section in Figure 4.

As shown in Figure 1, the section 3 of the tire comprises five ribs 7, 8, 9, 10, and 11 that run circumferentially around the tire. Of these, the middle rib 9 is made with parallel sides without recesses. The ribs 8 and 10 have parallel sides which are recessed at short intervals on each side. The ribs 7 and 11 also have parallel sides which are also recessed at short intervals on each side. The recesses in the ribs 7 and 11 are alternated or staggered with reference to the recesses in the ribs 8 and 10. These sections 3 of standard width occur at regular intervals around the periphery of the tire.

Alternating with these sections 3 are the wide sections such as are shown at 5 and 6. These sections comprise five circumferential ribs 12, 13, 14, 15 and 16. The middle rib 14 has parallel sides, which sides are recessed at intervals, the recesses in each case extending inwardly toward the crown of the tire. The ribs 13 and 15 also have parallel sides with recesses extending inwardly toward the crown of the tire and outwardly therefrom. The ribs 12 and 16 also have parallel sides with recesses extending inwardly toward the crown of the tire and outwardly therefrom. The recesses in the ribs 13 and 15 are alternated with the recesses in the ribs 12, 14 and 16.

The ribs 12, 13, 14, 15 and 16 run continuous with the ribs 7, 8, 9, 10 and 11, respectively, but the ribs 12, 14 and 16 are considerably wider than the corresponding ribs 7, 9 and 11 and are connected thereto by short sections that are placed on a slant. The ribs 13 and 15 are substantially the same width as the ribs 8 and 10, and likewise have slanting connections between them.

As shown in cross section in Figure 4, the section 5 is much wider than the section 3. Each of the wide sections form shoulders 18, 19, 20 and 21 with reference to the narrow sections. These shoulders have a tendency to dig in and engage the hard or soft parts of the road to better advantage, and cause the tire to grip the road better, preventing the tires from skidding forward, or backward, or sideways.

The shoulders 18 and 19 are shown in elevation in Figure 3, as compared with the section of the tire of standard width. Similar shoulders 20 and 21 are formed at the other end of the section 5 and at each end of the section 6, and the corresponding sections that are formed at intervals around the tire.

It will be seen in Figure 3 that the radius of the sections of the tread of standard width is comparatively short, and it will be seen in both Figures 3 and 4 that the radius of the wide sections is relatively long, so that each of the wide sections will have a wide rectangular bearing surface on the road that tends to grip it and hold the tire firmly in place thereon.

As shown in Figure 1, the grooves 24, 25, 26 and 27 are arranged in pairs that slant away from each other, and as these grooves engage the road they tend to draw both sides of the tire towards the crown, giving a balanced effect to the tire, which holds the tire against skidding sideways in either direction.

I claim:

1. A tire having a tread made up of sections of a width less than the horizontal diameter of the tire and sections of a width equal to the horizontal diameter of the tire, each section being made up of parallel ribs with grooves between them, some of the ribs of the extra wide sections being wider than the corresponding ribs in the first named sections of lesser width.

2. A tire having a tread made up of sections of a width less than the horizontal diameter of the tire and sections of extra width, each section being made up of parallel ribs, some of the ribs of the extra wide sections being wider than the corresponding ribs in the first named sections of lesser width, some of said ribs having transverse recesses formed therein at short intervals.

3. A tire having a tread made up of sections of a width less than the horizontal diameter of the tire and sections of extra width, each section being made up of parallel ribs, some of the ribs of the extra wide sections being wider than the corresponding ribs in the first named sections of lesser width, some of said ribs having transverse recesses formed therein at short intervals, the recesses on one rib being staggered with reference to the recesses on the adjacent rib.

4. A tire having a tread made up of sections of a width equal to the horizontal diameter of the tire and sections of extra width, each section being made up of parallel ribs with grooves between them, some of the ribs of the extra wide sections being wider than the corresponding ribs in the sections of standard width, said ribs and grooves diverging or converging between the sections.

5. A tire having a tread made up of sections therein of a width substantially equal to the horizontal diameter of the tire, said section being made up of parallel ribs with grooves between them, said ribs being inclined inwardly at each end of the section, intermediate sections of narrower width, each of said sections having the same number of parallel ribs, each of said ribs being connected to the adjacent ribs of the wide section, said ribs running continuously around the tread of the tire.

6. A tire having a tread made up of sections therein of a width substantially equal to the horizontal diameter of the tire, said section being made up of parallel ribs with grooves between them, said ribs being inclined inwardly at each end of the section, some of said ribs having transverse recesses formed therein at short intervals, intermediate sections of narrower width, each of said sections having the same number of parallel ribs, each of said ribs being connected to the adjacent ribs of the wide section, said ribs running continuously around the tread of the tire.

7. A tire having a tread made up of sections therein of a width substantially equal to the horizontal diameter of the tire, said section being made up of parallel ribs with grooves between them, said ribs being inclined inwardly at each end of the section, some of said ribs having transverse recesses formed therein at short intervals, the recesses on one rib being staggered with reference to the recesses on the adjacent rib, intermediate sections of narrower width, each of said sections having the same number of parallel ribs, each of said ribs being connected to the adjacent ribs of the wide section, said ribs running continuously around the tread of the tire.

HARRY Z. BISHOP.